United States Patent
Catelli et al.

(10) Patent No.: US 11,627,746 B2
(45) Date of Patent: Apr. 18, 2023

(54) PLANT AND METHOD OF PRODUCTION OF PUREE

(71) Applicant: CFT S.P.A., Parma (IT)

(72) Inventors: Roberto Catelli, Parma (IT); Stefano Romei, Parma (IT); Mario Gozzi, Parma (IT)

(73) Assignee: CFT S.P.A., Parma (IT)

( * ) Notice: Subject to any disclaimer, the term of this patent is extended or adjusted under 35 U.S.C. 154(b) by 397 days.

(21) Appl. No.: 16/620,196

(22) PCT Filed: Jun. 8, 2018

(86) PCT No.: PCT/IB2018/054141
§ 371 (c)(1),
(2) Date: Dec. 6, 2019

(87) PCT Pub. No.: WO2018/225020
PCT Pub. Date: Dec. 13, 2018

(65) Prior Publication Data
US 2021/0186040 A1  Jun. 24, 2021

(30) Foreign Application Priority Data
Jun. 9, 2017 (IT) .......................... 102017000063635

(51) Int. Cl.
*A23B 7/01* (2006.01)
*A23L 19/00* (2016.01)
(Continued)

(52) U.S. Cl.
CPC ................ *A23B 7/01* (2013.01); *A23L 3/001* (2013.01); *A23L 3/005* (2013.01); *A23L 5/15* (2016.08);
(Continued)

(58) Field of Classification Search
CPC ... A23B 7/01; A23L 19/09; A23L 5/15; A23L 3/001; A23L 3/005; H05B 3/009
See application file for complete search history.

(56) References Cited

U.S. PATENT DOCUMENTS

| 5,562,024 A * | 10/1996 | Polny, Jr. ................... A23L 3/22 99/451 |
| 6,231,908 B1 * | 5/2001 | Lelieveld ................... A23L 3/32 99/473 |
| 2014/0134318 A1 | 5/2014 | Catelli et al. |

FOREIGN PATENT DOCUMENTS

EP 2022342 A1 2/2009

OTHER PUBLICATIONS

Vincente, Antonio. "Ohmic heating in the food industry." New Food Magazine. Jun. 1, 2009. pp. 3-14. URL: https://www.newfoodmagazine.com/article/610/ohmic-heating-in-the-food-industry/.

(Continued)

*Primary Examiner* — Steven N Leff
(74) *Attorney, Agent, or Firm* — Pearne & Gordon LLP; Bryan M. Gallo (57) ABSTRACT

A method for producing a purée from a food product, comprising the following steps:
  refining the food product up to obtaining a purée;
  de-activating the enzymes by heating the purée, in order to prevent oxidation of the purée.
The step of de-activating the enzymes comprises the step of passing an electric current through the purée between electrodes of a first ohmic heater (31).

6 Claims, 5 Drawing Sheets

(51) Int. Cl.
   *A23L 5/10*    (2016.01)
   *A23L 3/00*    (2006.01)
   *A23L 3/005*   (2006.01)
   *H05B 3/00*    (2006.01)
(52) U.S. Cl.
   CPC ............ *A23L 19/09* (2016.08); *H05B 3/0009* (2013.01); *A23V 2002/00* (2013.01)

(56) References Cited

OTHER PUBLICATIONS

Nistor, et al. "Ohmic heating process characterizations during apple puree processing." Journal of Agroalimentary Processes and Technologies, vol. 19, No. 2, Jan. 1, 2013. pp. 228-236. URL: https://journal-of-agroalimentary.ro/admin/articole/19493L38_Vol_19_2_2013_228-236.pdf.

Nistor, et al. "Ohimic treatment of apple puree (Golden Delicious variety) in relation to product quality." Food Science and Biotechnology, vol. 24, No. 1, Feb. 28, 2015. pp. 51-59.

International Report and Written Opinion issued in corresponding PCT Application No. PCT/IB2018/054141 dated Aug. 22, 2018, 12 pages.

\* cited by examiner

PLANT AND METHOD OF PRODUCTION OF PURÉE

CROSS-REFERENCE TO RELATED APPLICATIONS

This application is a National Phase Application of PCT International Application No. PCT/IB2018/054141, International Filing Date, Jun. 8, 2018, claiming priority to Italy Patent Application No. 102017000063635, filed Jun. 9, 2017, each of which is hereby incorporated by reference in its entirety.

TECHNICAL FIELD

The present invention relates to a plant and a method for production of purée from food products.

For example, the process according to present invention is used for extraction of fruit purée, a product obtained by separating undesired waste such as seems (or stones), peels and stems from whole fruits using a screen. Fruit purée is mainly used as a semi-processed food product, for obtaining other products such as juices, nectars, compotes, fruit jellies and jams.

PRIOR ART

In the prior art, the extraction of fruit purées can be carried out by applying two different technologies, respectively known as hot-extraction and cold-extraction, which have different advantages and are to some extent complementary.

The technology of hot-extraction includes a step of cooking minced fruits previous to the steps of screening and refining which determine the true and proper extraction of the purée. The cooking, typically carried out internally of a heater inside which the product reaches temperatures comprised between 85° C. and 95° C., serves mainly to deactivate the oxidative enzymes (peroxidases PO, polyphenol oxidases PPO) and the pectolytic enzymes present in the minced fruit. Enzyme deactivation is necessary for preventing two undesired effects: on the one hand the browning of the product due to oxidation determined by the oxidative enzymes present therein; on the other hand the denaturation of the pectins in the fruit, which give the finished product the desired viscosity, by action of the pectolytic enzymes. To be effective, the deactivation must be carried out immediately following the step of mincing of the product, and therefore prior to the above-mentioned steps of screening and refining, as the enzymes, already present internally of the fruit, are activated in contact with oxygen and therefore at the moment of mincing. On the other hand, it is only in the crossing of the screening-refining group that the separation of the pulp and the juice from the seeds, peels and other undesired waste takes place. By carrying out the cooking of the product upstream of this separation, the waste is cooked together with the rest of the fruit, causing a significant worsening of the flavour of the product obtained as well as an alteration of the colour of the product with respect to the natural colour of the pulp. Further, the pesticides that may be present on the surface of the peel of various fruits are blended with the crushed pulp, with obvious negative consequences on the quality of the product obtained. Lastly, the direct injection of the steam into the heater, if of the direct type, dilutes the product and thus reduces the quality and increases the production costs due to the re-evaporation necessary downstream of the heater.

Cold-extraction enables obviating the above-mentioned drawbacks, by postponing the heating of the product, which is thus successfully carried out during the steps of screening and refining. In this way, the processing wastes are immediately separated from the product, and the heating is carried out only on the pulp of the product. The result is a general improvement of the organoleptic properties of the purée obtained; in particular, the presence of peels and seeds does not alter the taste and colour of the finished product. Cold-extraction, however, also has some drawbacks due to the late deactivation of the oxidative and pectolytic enzymes. Further, the pectolytic enzymes, if deactivated with delay, determine the denaturation of the majority of the pectin originally contained in the processed fruits, with a consequent worsening of the characteristics of viscosity of the product obtained.

In the case of cold-extraction, use of a production line is known which comprises:
   a mincer;
   a refiner downstream of the mincer;
   a pump which collects purée in output from the refiner and sends it to an enzyme deactivator in which, by action of the heat transferred by a thermovector fluid, the purée is brought to above a variable predetermined temperature according to the type of product; it is then sent on to a "hot" refiner and then to an aseptic plant, where the temperature is in turn increased up to a sterilisation temperature. Thereafter the product is cooled and sent on to an aseptic filler.

Patent EP2022342 further describes an improvement of the solution, in which there is an anaerobic process and a transfer pump is not present. In this case the purée in outlet from the refiner is immediately struck by the vapours generated by the enzyme deactivator and thus the presence of oxygen and the enzyme deactivation times are reduced, preventing the above-described drawbacks.

US2014/134318 discloses a plant and a method for producing purée from a food product.

AIM OF THE INVENTION

In this context, the technical task underlying the present invention is to provide a plant and a method for extraction of a purée from food products which enables making the transformation process more rapid.

In particular, an aim of the present invention is to minimise the area below a curve with the process temperature on the y-axis and the time on the x-axis.

The stated technical task and specified objects are substantially achieved by a plant and a method for extraction of purée, comprising the technical characteristics disclosed in one or more of the appended claims.

BRIEF DESCRIPTION OF THE DRAWINGS

Further characteristics and advantages of the present invention will become more apparent from the indicative and thus non-limiting description of a preferred, but not exclusive, embodiment of a plant and a method for extraction of purée, as illustrated in the appended drawings, of which.

DETAILED DESCRIPTION OF PREFERRED
EMBODIMENTS OF THE INVENTION

A plant for extracting purée from food products is denoted in the appended figures by the reference number 1.

The plant 1 comprises a refining station 2 for refining the food products for obtaining a purée.

The refining station 2 comprises:
a mincer 20;
a first refiner 21 located downstream of the mincer 20.

The mincer 20 performs a coarse initial mincing for the subsequent processing step, while the first refiner 21 enables a purée to be obtained. The refining station 2 can possibly comprise a second refiner 22. In any case this is a cold-extraction of the purée.

Internally of the refining station 2 there is appropriately an inlet of an inert fluid (typically a gas). The pressure of the mixture of the inert fluid and the vapours present is maintained at a higher level than the external atmospheric pressure. The inert fluid can be water steam or alternatively nitrogen, carbon dioxide or other gases and vapours can be used, not comprising free oxygen. The inert fluid can also be a gaseous mixture comprising more than one of the gases or vapours mentioned in the foregoing. The presence of the inert fluid at higher than atmospheric pressure enables reducing the presence of air and thus reducing the enzyme reactions linked to the presence of oxygen.

Upstream of the refining station the plant 1 advantageously comprises a segmented rotary valve 11 for directing the food products to the refining station 2 (in particular to the mincer 20). The segmented rotary valve 11 limits the inlet of air. The food product (i.e. the fruit to be processed) is introduced into a sector that is open to the external environment of the valve 11, and then the valve 11 is rotated so as to interrupt the fluid communication with the atmosphere of the loaded sector. In this position a pump (not illustrated) advantageously eliminates the residual air internal of the sector being described. Lastly, the valve 11 is further rotated so as to place the sector in communication with the inside of the mincer 20.

The plant 1 appropriately comprises heating means 3 for heating the purée.

The heating means 3 comprises a first ohmic heater 31. The first ohmic heater 31 comprises electrodes which allow the passage of electric current through the purée. The electric current heats the purée by Joule effect, causing a very rapid increase in temperature. The electrodes are immersed in the purée. The electrodes are appropriately in direct contact with the purée.

Figure 4:
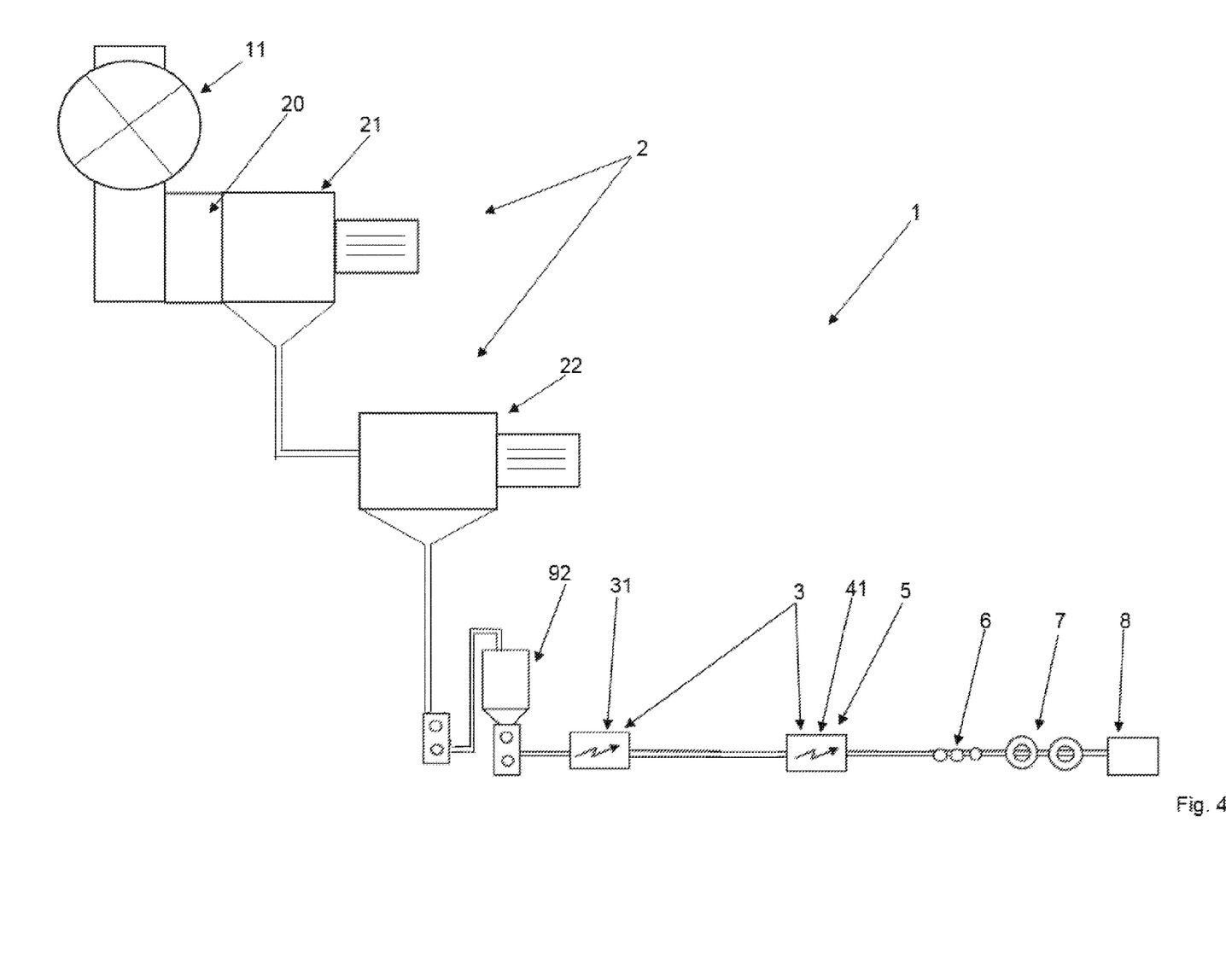
FIGS. 4 and 5 are schematic views of further constructional solutions according to the present invention (the solutions of FIGS. 4 and 5 can be incorporated in a same plant which can take on two distinct operating modes/configurations associated to the corresponding figures).

Advantageously upstream of the first ohmic heater 31 the plant 1 comprises a deaerator 92 (see for example FIG. 4). This protects the first ohmic heater 31 from inlet of air. The presence of air in the first ohmic heater 31 might generate ionisation of the air and consequent electrical discharges able to damage the heater. The deaerator 92 is advantageously located downstream of the refining means 2 and in particular downstream of the first and/or second refiner 21, 22.

The plant 1 comprises an enzyme de-activation station 4. The enzyme de-activation station 4 is located downstream of the enzyme refining station 2.

The first ohmic heater 31 is appropriately integrated into the enzyme de-activation station 4.

Figure 2:
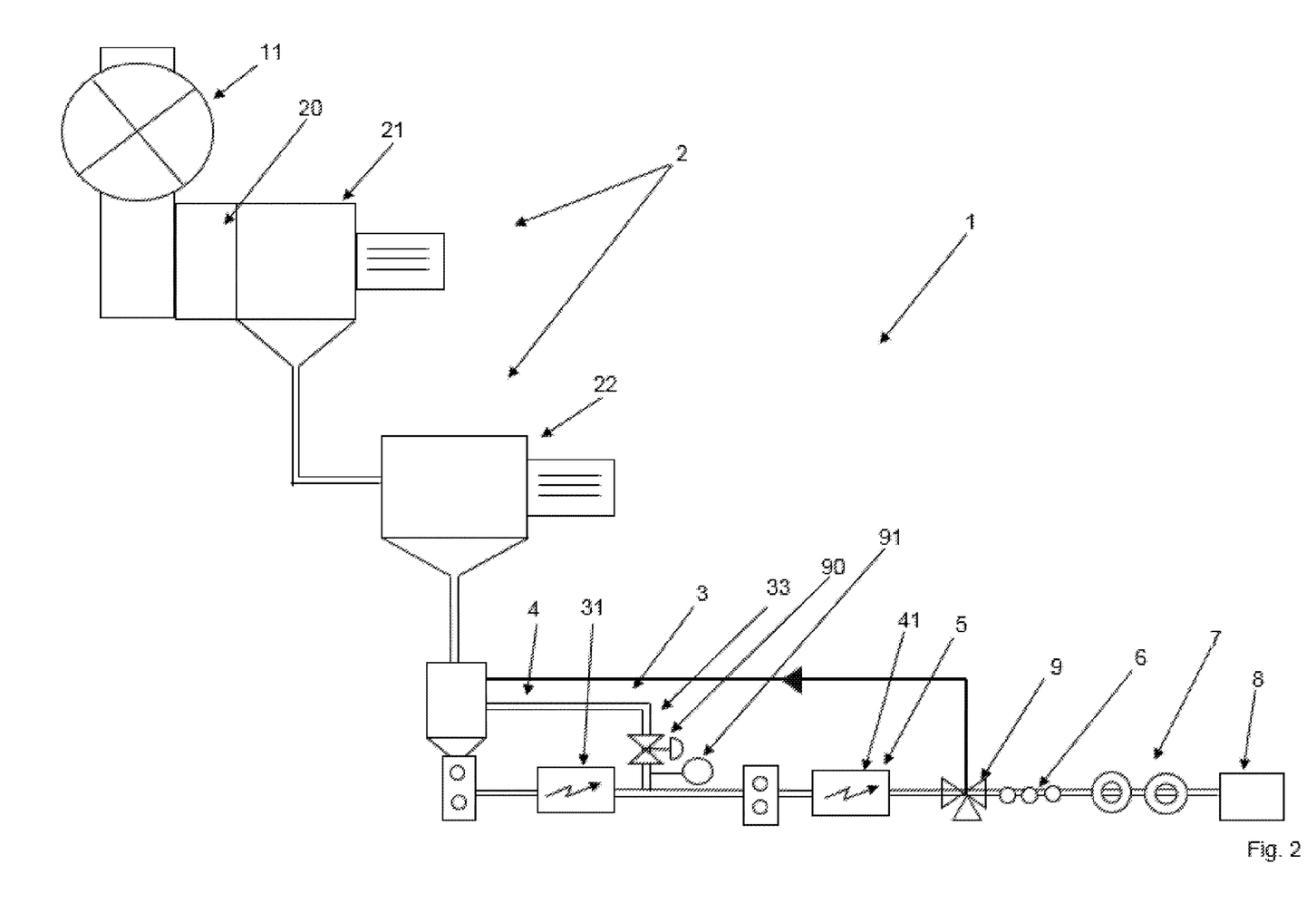
FIG. 2 is a schematic view of an alternative solution to that of FIG. 1.

As illustrated by way of example in FIG. 2, the plant 1 further comprises a sterilising station 5 located downstream of the enzyme de-activation station 4. The heating means 3 comprises a second ohmic heater 41 located in said sterilising station 5. This is also responsible for a sharp increase in temperature.

In this case, the enzyme de-activation station 4 advantageously determines a heating up to a temperature comprise between 65° C. and 110° C., preferably between 90° C. and 100° C. (using the first ohmic heater 31). The sterilising station 5 determines a subsequent heating to a temperature of at least 100° C. (with a "high acid" product) or 125° C. (with a "low acid" product); this is done using the second ohmic heater 41.

The heating means 3 for heating the purée also comprises a recycling system 33 of the purée from downstream to upstream of the first ohmic heater 31 for heating the purée coming from the refining station 2. This enables an even more intense and rapid heating of the purée coming from the refining station 2 with respect to the solution in which only the first ohmic heater 31 were present. The recycling system 33 of the purée advantageously includes use of the first and the second ohmic heater 31, 41. In fact in this case the first heater 31 determines a first heating up to a temperature of lower than or equal to 100° C. and the second heater determines heating up to a higher temperature to enable sterilisation.

In fact the recycling system 33 returns the product into a non-pressurised tank located downstream of the refining means 2 of the hot product. The recycled product must have a temperature that is lower than or equal to 100° C. to avoid flashing. Thus the heating is split between the first and the second ohmic heater 31, 41 and between the two the product is collected using the recycling system 33.

Figure 1:
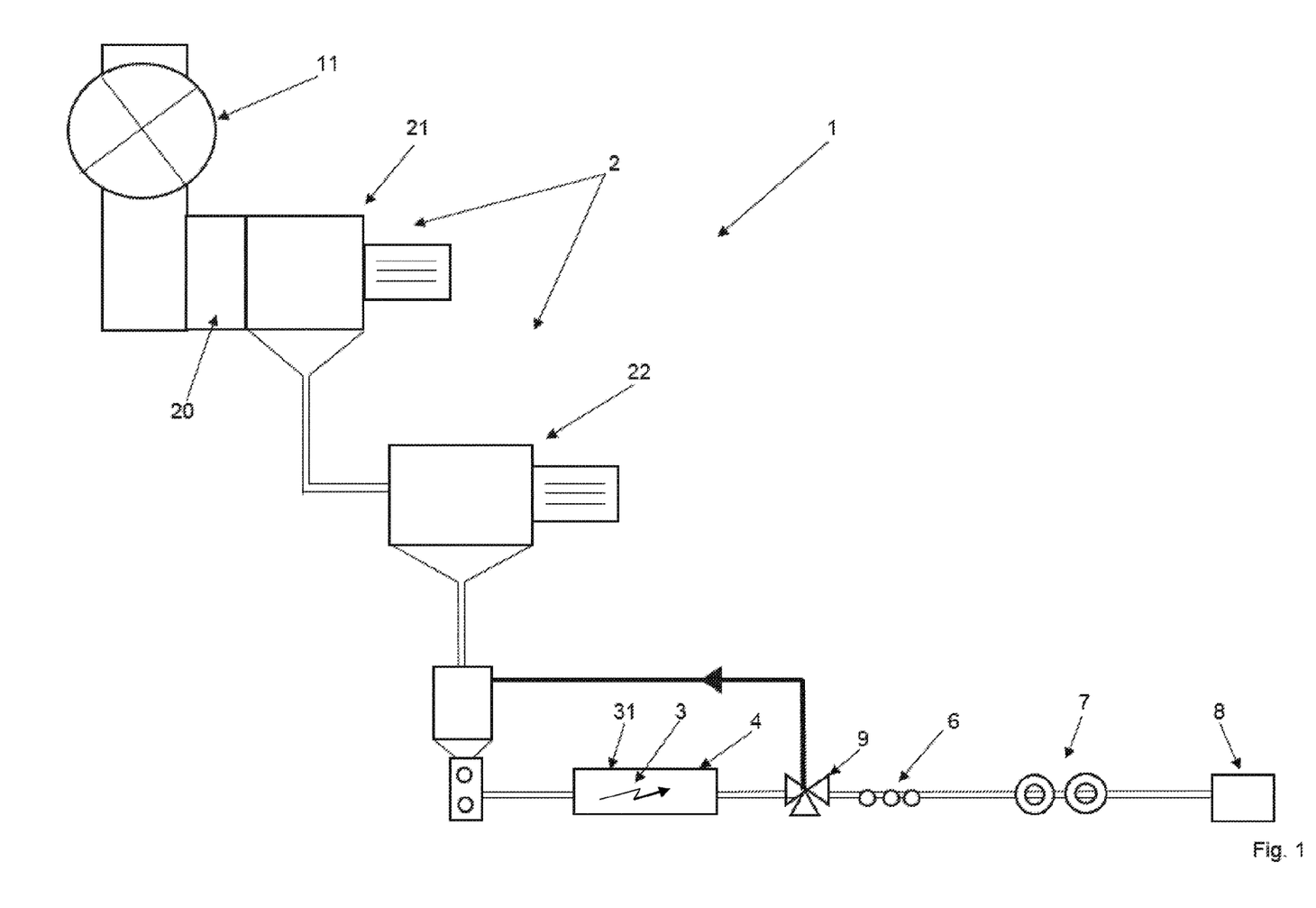
FIG. 1 is a schematic view of a plant according to the present invention.

In the solution illustrated by way of example in FIG. 1, the plant 1 comprises an enzyme de-activation station 4 which comprises the first ohmic heater 31. In this case the sterilising system might be absent, or the enzyme de-activation station 4 and the sterilising station 5 might coincide and both might comprise the first ohmic heater 31 (while the second ohmic heater 41 might be absent). In this last solution the first ohmic heater 31 would be responsible both for the enzyme deactivation and the sterilisation. In this way the bacterial flora (pathogenic and alteration bacteria) is eliminated, and the state known in the sector as "commercial sterility" is attained.

There is advantageously no refiner downstream of the first ohmic heater 31. In particular, there is no refiner between the first and the second ohmic heater 31, 41. In this way the processing time for the purée can be reduced.

Figure 3:
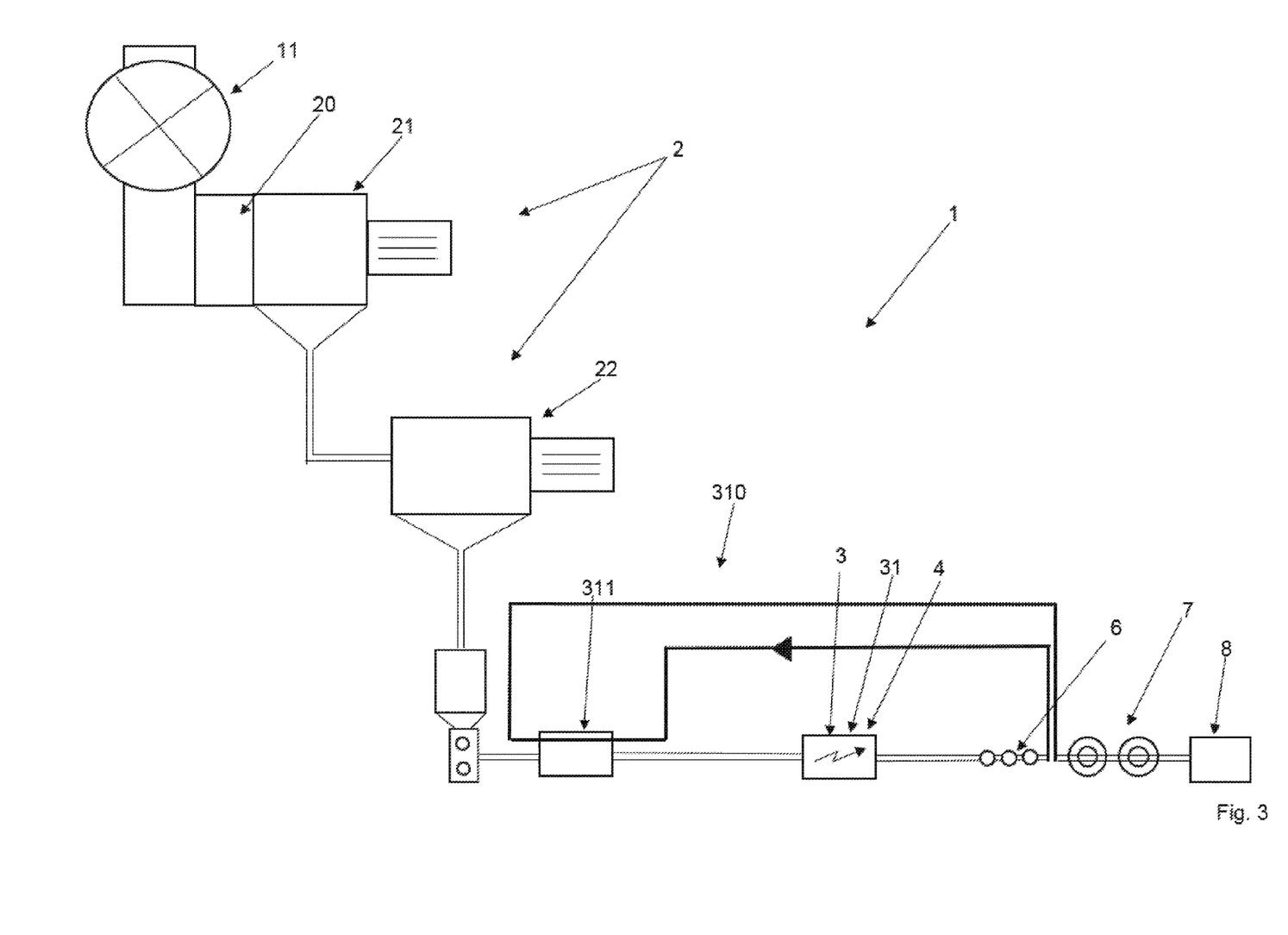
FIG. 3 is a schematic view of an alternative solution to that of FIG. 1 or 2.

In the solution illustrated in FIG. 3, the plant 1 comprises a pre-heating system 310 of the purée in arrival from the refining station 2 upstream of the first ohmic heater 31 (using purée downstream of the first heater 31; this typically occurs in a product-product heat exchanger that defines a heat recovery unit); for example this purée can be pre-heated up to a temperature comprised between 55° C. and 65° C. Further, the purée preheating system 310 in arrival from the refining station 2 also enables cooling the purée downstream of the first heater 31. The purée collected (all or in part) downstream of the first heater 31 is advantageously re-introduced downstream of the first heater 31. The pre-heating system 310 enables a heat recovery. In this case, the recycling system 33 of the purée is appropriately absent.

Only the first ohmic heater 31 is advantageously used to sterilise the purée to sterilisation (125° C. for a low acid product).

Reference is now made to the embodiment exemplified in FIG. 4 which summarises some characteristics already mentioned in the foregoing. The heating means 3 comprises the first ohmic heater 31 (which advantageously carries out a heating of the product up to a temperature of lower than or equal to 100° C. if the second heater 41 is also present or can reach a higher sterilisation temperature, for example, of 125° C., if the second ohmic heater 41 is absent). If the second ohmic heater 41 is absent, the pre-heating system 310 (described herein above and not illustrated in FIG. 4) might additionally be used. As previously mentioned, the heating means 3 might comprise the second ohmic heater 41 (which advantageously carries out a heating of the product up to a sterilisation temperature of the product, for example 125° C. if the product is low acid). Advantageously, upstream of the first heater 31 there is a (cold) deaerator 92. A volumetric pump is located upstream of the deaerator 92. Owing to the presence of the deaerator 92 the product is not recycled to prevent concentration of the product.

Figure 5:
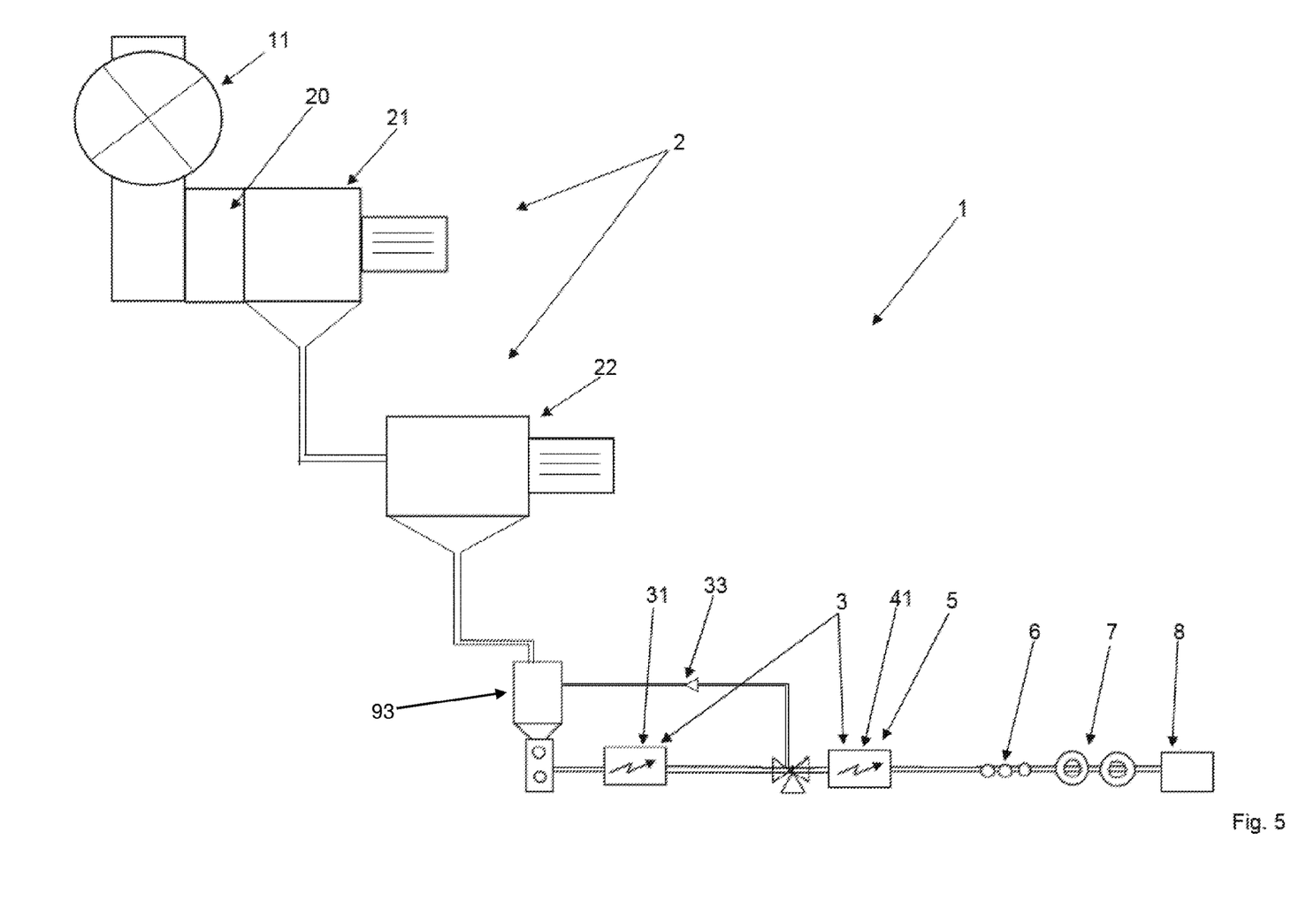

Reference is now made to the embodiment exemplified in FIG. 5 which summarises some characteristics already mentioned in the foregoing. The heating means 3 comprises:

the first ohmic heater 31;
the second ohmic heater 41.

In this case a tank 93, not de-aerated, is located upstream of the first heater 31. In this case the preheating system 310 is absent. Advantages of this solution are a low ascorbic acid consumption, low oxidation, modest processing times.

The plant 1 further comprises a maintaining system 6 of the purée at temperature. The plant 1 further comprises a cooling system 7 of the purée. The cooling system 7 advantageously acts sharply. The purée cooling system 7 can advantageously comprise a flash cooler or a plate exchanger or a scraped-surface heat exchanger (for example an aseptic scraped-surface heat exchanger in which preferably glycol-water circulates). The plant 1 lastly comprises a filler 8 which enables packaging the purée. The purée maintaining system 6 is advantageously located downstream of the enzyme de-activation station 4. The purée maintaining system 6 is advantageously also located downstream of the sterilising station 5 (where present). The cooling system 7 of the purée is located downstream of the temperature maintaining system 6 of the purée. Lastly, the filler 8 is located downstream of the cooling system 7 of the purée.

For the sake of completeness, in the figures reference number 9 denotes a diverter valve. It recycles the purée upstream when the temperature thereof is not sufficient. The diverter valve 9 is typically located downstream of the enzyme de-activation station 4 or the sterilising station 5 (if present). However, it is located upstream of the temperature maintaining system 6.

The object of the present invention further relates to a method for producing purée from a food product. This method can be implemented by a plant 1 having one or more of the characteristics described previously.

This method advantageously comprises a step of refining the food product up to obtaining a purée. This takes place in a refining station 2, for example comprising a mincer 20 and a first refiner 21 and possibly a second refiner 22. The step of refining the food product typically includes a preliminary and coarser mincing (this can be done for example in the mincer 20) followed by a finer refining. As mentioned in the foregoing, following the mincer 20 the step of refining the purée takes place in at least a first and possibly a second refiner 21, 22. The second refiner 22 (if present) is located downstream of the first refiner 21. During the refining step the processing wastes, such as, for example, stems, seeds, leaves, etc., are also eliminated.

The refining via the first refiner 21 (but a like process can be done in the second refiner 22) advantageously comprises the substep of passing the product through a screen which envelops a bladed impeller which radially pushes the product against the screen. The screen will thus enable the purée to pass, while retaining the products to be eliminated.

The method advantageously comprises the step of introducing the food products internally of a conveying line to said mincer 20. For this purpose the food products are introduced into a segmented rotary valve 11. The segments are sectorial and each segment, during the rotation, for a limited time superposes on an inlet in such a way as to enable introduction of the food products.

During the step of refining the product, the method comprises the step of deactivating the enzymes to prevent oxidation of the purée. This takes place by heating the purée. The heating must take place above a temperature of enzyme deactivation.

The step of de-activating the enzymes comprises the step of passing an electric current through the purée between electrodes of a first ohmic heater 31. The ohmic heater 31 enables a sharp increase of the temperature.

In the solution illustrated in FIG. 2, the method also comprises a step of conveying into the refining station 2 the vapours generated in the step of deactivating the enzymes, in particular into a refining chamber which envelops the screen of the first refiner 21 or of the second refiner 22 (if present). The vapours that are generated in the rapid heating of the purée introduced into the circuit naturally rise towards the overlying refining chamber.

The raising of the vapour internally of the refining chamber produces a double-effect: firstly it creates an inert atmosphere inside the chamber; secondly it enables not losing the aromatic vapours generated during the cooking step of the purée, which are then re-condensed by the cold product in the chamber.

In particular, the step of de-activating the enzymes comprises a step of recycling a part of the product from downstream to upstream of the first ohmic heater 31, for preheating the purée in inlet into the first ohmic heater 31. This enables making the heating of the purée even more rapid, and accelerates the deactivation of the enzymes.

The step of recycling the purée is controlled by a pump in combination with a valve 90 that regulates the quantity of purée which is recycled or not (and thus regulates the outlet of the product). The valve 90 is advantageously controlled by means of a pressure sensor 91 of the purée. The sensor 91 is typically located upstream of the valve 90.

The method can further comprise a step of sterilising the purée following the step of de-activating the enzymes. The step of sterilising the purée comprises a step of heating the purée by passing an electric current through the purée. As for example is illustrated in the solution in FIG. 1, the step of sterilising the purée can also take place in the first ohmic heater 31. The step of deactivating the enzymes is thus contemporary with the step of reducing the bacterial flora (in the technical sector the term "commercial sterility" is appropriately used).

As is illustrated by way of example in FIG. 2, the step of sterilising the purée takes place in a second ohmic heater 41.

As illustrated in FIG. 3, the method can comprise a step of preheating the purée upstream of the first ohmic heater 31. This step includes placing the purée downstream of the first ohmic heater in heat contact (typically in a heat exchanger 311) with the purée located upstream of the first ohmic heater 31. This also enables cooling the purée downstream of the first ohmic heater 31. The refining step takes place upstream of the first ohmic heater 31. No refining of the purée takes place downstream of the first ohmic heater 31. The method appropriately comprises the step of carrying out a de-aeration upstream of the first ohmic heater 31. The deaerating is typically carried out downstream of or at the refining means 2 and in particular downstream of the first and/or second refiner 21, 22. This is for improving the conservation of the product.

Following the step of sterilising the purée the method includes maintaining the purée at temperature, then cooling it and lastly filling predetermined containers.

The cooling is appropriately aseptic. In particular, the step of cooling the purée includes a rapid cooling. The cooling step of the purée appropriately includes the use of a flash cooler, a plate exchanger, a scraped-surface exchanger (advantageously an aseptic scraped-surface exchanger).

The present invention provides important advantages, as it reduces the volumes and exposure times to the temperature.

Firstly, it enables accelerating production of the purée. It further enables minimising the dimensions of the plant. A further important advantage is that it minimises the temperature-time curve of the process (cooking value).

The invention as it is conceived is susceptible to numerous modifications and variants, all falling within the scope of the inventive concept characterising it. Further, all the details can be replaced with other technically-equivalent elements. In practice, all the materials used, as well as the dimensions, can be any according to requirements.

The invention claimed is:

1. A method for producing a purée from a food product, comprising the following steps:
    refining the food product up to obtaining a purée;
    de-activating the enzymes by heating the purée, in order to prevent oxidation of the purée;
the step of de-activating the enzymes comprising the step of passing an electric current through the purée between electrodes of a first ohmic heater (31) integrated into an enzyme de-activation station (4); the step of de-activating the enzymes comprising a step of recirculating a part of the purée from downstream to upstream of the first ohmic heater (31) by means of a recycling system (33) from downstream to upstream of the first ohmic heater (31), for pre-heating the purée in inlet into the first ohmic heater (31);
    characterized in that it comprises the step of sterilizing the purée following the step of de-activating the enzymes, the step of sterilizing the purée comprising a step of heating the purée by passing an electric current through the purée; the step of de-activating the enzymes takes place in said first ohmic heater (31), the step of sterilizing the purée taking place in a second ohmic heater (41); the second ohmic heater (41) being part of a sterilising station (5) located downstream of the enzyme de-activation station (4); between the first and the second ohmic heater (31, 41) said part of the purée being collected using the recycling system (33), the recycling system (33) from downstream to upstream of the first ohmic heater (31) developing starting from a zone between the first and second ohmic heater (31, 41).

2. The method according to claim 1, characterized in that the step of refining the purée takes place in at least a first and a second refiner (21, 22), the second refiner (22) being located downstream of the first refiner (21) and upstream of the first ohmic heater (31), no refining of the purée taking place downstream of the first ohmic heater (31).

3. The method according to claim 2, characterized in that the first heater (31) determines a first heating up to a de-activation temperature of lower than or equal to 100° C.; the second heater (41) determining heating up to a sterilization temperature to enable sterilization, the sterilization temperature being higher than the de-activation temperature.

4. The method according to claim 1, characterized in that the first heater (31) determines a first heating up to a de-activation temperature of lower than or equal to 100° C.; the second heater (41) determining heating up to a sterilization temperature to enable sterilization, the sterilization temperature being higher than the de-activation temperature.

5. The method according to claim 1, characterized in that:
    the step of refining the food product up to obtaining a purée is implemented by refining means (2);
    the recycling system (33) returns the purée into a non-pressurised tank located downstream of refining means (2).

6. The method according to claim 1, characterized in that it comprises the steps of:
    maintaining the purée at temperature by means of a purée maintaining system (6) located downstream of a sterilizing station (5) in which the step of sterilizing the purée takes place;
    cooling the purée by means of a purée cooling system (7); the cooling system (7) of the purée being located downstream of the temperature maintaining system (6) of the purée;
    packaging the purée by means of a filler (8) located downstream of the cooling system (7);
    recycling the purée upstream when the temperature thereof is not sufficient by means of a diverter valve (9) located downstream of the sterilizing station (5).

* * * * *